No. 803,600. PATENTED NOV. 7, 1905.
J. H. KENDALL.
ANIMAL STOCK.
APPLICATION FILED NOV. 16, 1904.
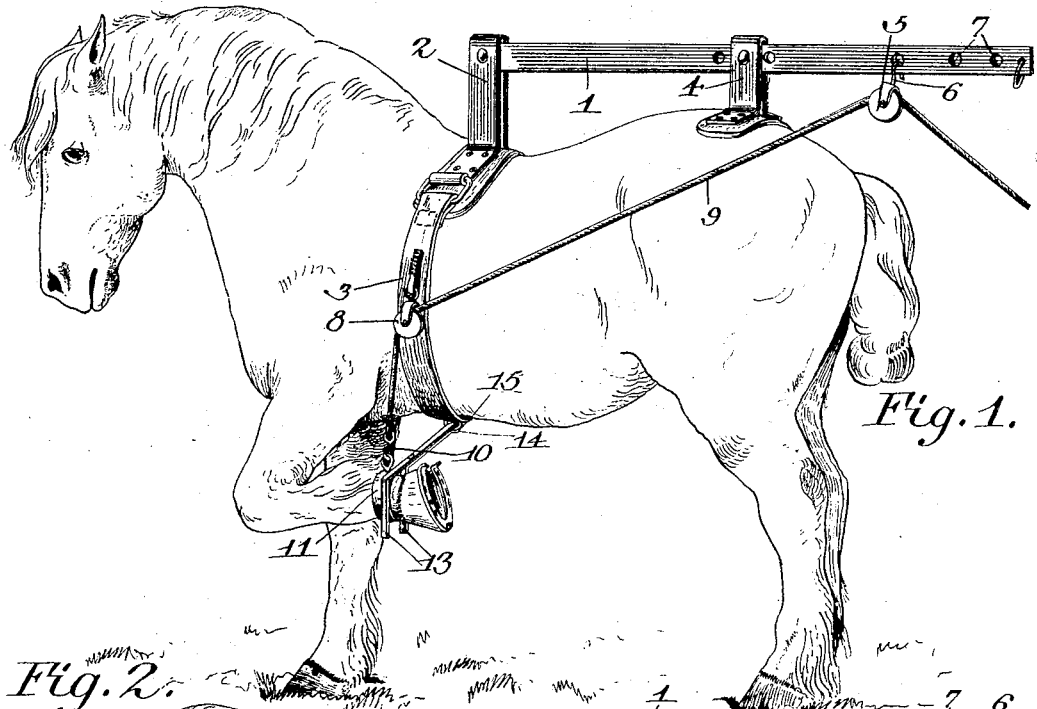
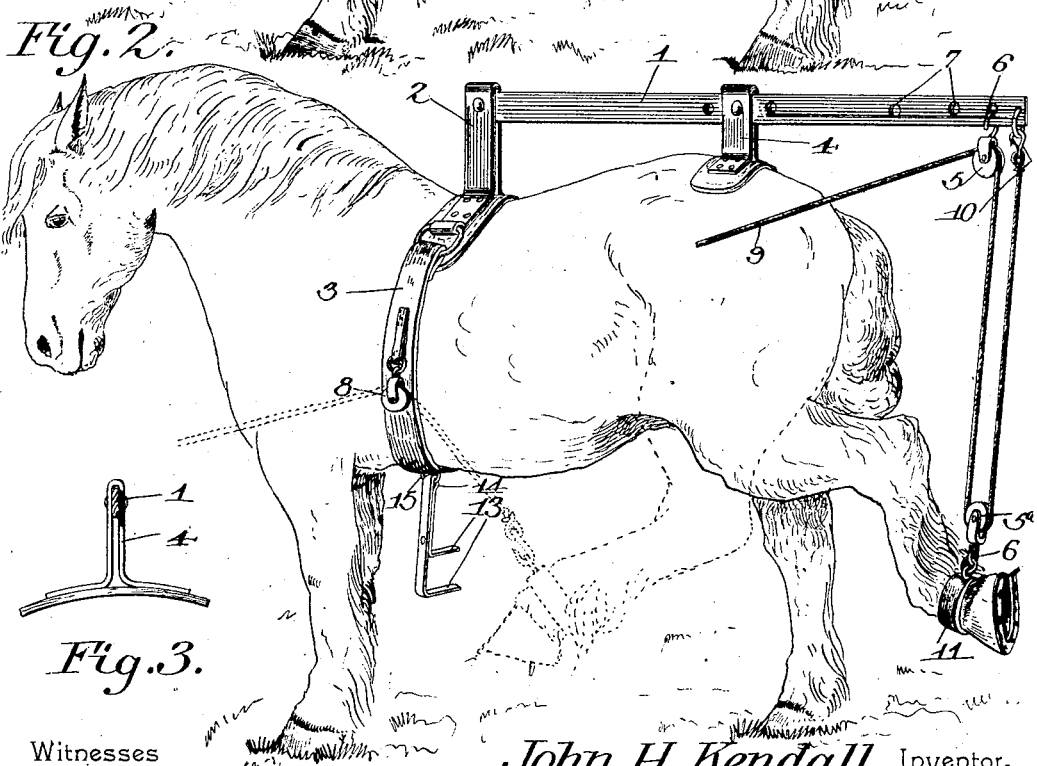
Witnesses
John H. Kendall, Inventor.
by C. A. Snow & Co.
Attorneys.

UNITED STATES PATENT OFFICE.

JOHN H. KENDALL, OF ILLIOPOLIS, ILLINOIS, ASSIGNOR, BY MESNE ASSIGNMENTS, OF ONE-HALF TO JOHN WILLIAM D. MAYES AND RICHARD D. DUGAN, OF ILLIOPOLIS, ILLINOIS.

ANIMAL-STOCK.

No. 803,600.   Specification of Letters Patent.   Patented Nov. 7, 1905.

Application filed November 16, 1904. Serial No. 233,021.

*To all whom it may concern:*

Be it known that I, JOHN H. KENDALL, a citizen of the United States, residing at Illiopolis, in the county of Sangamon and State of Illinois, have invented a new and useful Animal-Stock, of which the following is a specification.

This invention relates to animal-stocks of the class employed by horseshoers to secure the legs of an animal being shod, to prevent the animal from kicking, and to support the hoof in position to be operated upon.

The object of the invention is to provide an improved apparatus of the character named whereby any one of the legs of an animal being shod may be hoppled and raised to such position as will facilitate the work of shoeing the animal.

The construction of the apparatus will be fully described hereinafter in connection with the accompanying drawings, which form a part of this specification, and its novel features will be particularly pointed out in the appended claims.

In the drawings, Figure 1 is a view in perspective of the apparatus as applied to a horse. Fig. 2 is a perspective view of the apparatus in position upon a horse, illustrating the manner of supporting the hind leg of the horse in elevated position; and Fig. 3 is a detail view showing one of the saddle-frames in elevation and its supporting-bar in vertical section.

The reference-numeral 1 designates a rigid bar, to the front end of which is secured a saddle-frame 2, the latter preferably comprising a single piece of sheet metal bent upon itself, as shown.

3 designates a surcingle or securing-band the ends of which are attached by rings or loops to the opposite sides of the saddle-frame.

4 designates a saddle-frame secured to the bar 1 at about midway of the length of the latter and constructed to rest upon the horse, as illustrated in the drawings.

From the rear end of the bar 1 depend one or more pulleys 5, each of said pulleys being preferably suspended from the bar 1 by means of a hook 6, the end of the bar being formed with a series of openings 7 to permit of the adjustment of the pulleys to different positions upon the bar. The saddle-frame 4 is likewise preferably made adjustable upon the bar 1 to adapt it for use upon horses of different sizes.

A pulley 8 is supported at one side of the surcingle, and 9 designates a rope adapted to pass over the pulley 8 and from thence around one of the pulleys 5, the front end of said rope being provided with a snap-hook 10 to engage a hopple 11 upon the front foot of the horse. By means of this rope 9 the front foot may be readily supported in the position shown in Fig. 1. When it is desired to raise the hind leg of the horse, a hopple 11 thereon is engaged by a snap-hook on a pulley $5^a$, around which the rope 9 passes, and the rear end of the rope 9 is provided with a hook to engage a ring suspended from the bar 1.

To prevent the fore leg of the animal from moving outward against the body of the operator while being shod, I provide a guard device, preferably comprising a single piece of strap metal bent upon itself to form parallel arms 13 and an eye or loop 14, the latter serving as a means for securing the guard to a ring 15, swiveled to the under portion of the surcingle. The arms 13 of the guard are adapted to extend on opposite sides of the animal's foot, as illustrated in Fig. 1, and the manner of attaching the guard to the surcingle permits said guard to be turned upon the swivel and used on either side of the animal.

The forward saddle 2 rests upon the withers and the rear saddle upon the rump of the animal, and the adjustability of the saddle 4 insures the application of the strain or pressure to these parts of the animal.

It will be apparent that an apparatus constructed as above described may be readily operated in the manner illustrated in Figs. 1 and 2 and quickly applied to or removed from the back of the animal.

By attaching the rear end of the rope 9 to the front of a hopple on the hind leg of the horse and passing said rope forward over the pulley 8 the hind leg may be drawn forward in position for clenching the nails of the shoe.

While the construction as shown in the drawings constitutes a practical embodiment of the improvement, it will be understood that the invention is not restricted to the details shown, but includes all such variations and modifications as may fall within the spirit of the invention.

In the drawings the saddles are shown provided with the looped frames 2 and 4, through the upper portions of the loops of which passes the bar 1, thus preventing lateral displacement of the bar while permitting it to be held to each saddle-frame by a single fastening device. The pin or equivalent fastening device for the rear saddle is removable to permit the described adjustment of this saddle, and the slight pivotal or angular movement of the bar in a vertical plane parallel with and guided by the sides of the loops enables the bar to assume a position suiting the relative heights of the withers and rump of the animal to which the stock is applied and also permits the proper and fair seating of each saddle on the desired portion of the animal, whereby when the weight of the hoof is applied no uneasiness will be experienced at the points of contact of the saddles.

Having thus described the invention, what is claimed is—

1. An animal-stock comprising a bar having guides and adapted to be supported above the animal, saddle-frames supporting said bar, a securing-band for one of said frames, and a rope adapted to be attached to one of the legs of the animal, and passed over the guides upon said band and bar.

2. An animal-stock, comprising a bar, a saddle-frame secured to the forward end of said bar, a second saddle-frame secured to the bar at a point about midway of the length of the bar, a rope-guide adjacent to the rear end of the bar, a securing-band for the forward saddle-frame, a rope-guide on said band, and a rope adapted to pass over said guides.

3. An animal-stock comprising a rigid bar adapted to be supported above the back of an animal, a saddle-frame secured to the front portion of said bar, a securing-band therefor, a second saddle-frame supported upon said bar at about midway the length of the bar, a rope-guide adjustably secured upon the rear portion of the bar, a guide on the securing-band of the forward saddle-frame, and a rope passing over said guides and provided at its ends with fastening devices.

4. An animal-stock comprising a rigid bar, saddle-frames depending therefrom, a surcingle for securing the forward one of said saddle-frames upon an animal, means for elevating and supporting the legs of the animal, and a guard pivotally secured upon the surcingle in position to embrace the fore leg of the animal.

5. The combination with a bar, and saddle-frames depending therefrom, of a surcingle for securing the forward one of said saddle-frames upon an animal, means for elevating and supporting the legs of the animal, and a guard comprising arms adapted to embrace opposite sides of the fore leg of the animal, said guard being movably secured upon the surcingle.

6. The combination with a leg-supporting device, of a band adapted to be secured around the body of an animal, and a guard having a swiveled connection with said band to adapt the guard to be turned to either side of the animal, and provided with arms for engaging one foot of the animal.

7. An animal-stock having spaced front and rear saddles, and hoof-supporting means carried thereby, the saddles being movably mounted to adapt them to the portions of the body of the animal with which they come in contact.

8. An animal-stock having front and rear saddles, a connecting-bar supported thereby, said saddles having yielding connection with the bar to adapt them to the portions of the body of the animal with which they come in contact, and hoof-supporting means carried by the bar.

9. An animal-stock having front and rear saddles one of which is provided with a girth, a connecting-bar on which said saddles are pivotally connected, and hoof-supporting means carried by the bar.

10. An animal-stock having front and rear saddles, and hoof-supporting means including a bar connecting the saddles and pivotally mounted upon one of them.

11. An animal-stock having front and rear saddles, and hoof-supporting means including a bar with which the saddles have pivotal connection.

12. An animal-stock having front and rear saddles, hoof-supporting means including a bar pivotally mounted upon the front saddle, and means for adjustably securing the rear saddle to said bar.

In testimony that I claim the foregoing as my own I have hereto affixed my signature in the presence of two witnesses.

JOHN H. KENDALL.

Witnesses:
HARRY E. DICKERSON,
CHARLES MORGAN.